United States Patent [19]

Halik et al.

[11] 4,241,092

[45] Dec. 23, 1980

[54] GASIFIED CANDY DISPERSED IN A MATRIX OF SORBITOL

[75] Inventors: Joseph J. Halik, Ossining; Robert J. Ravallo, Mahopac; Gerald S. Wasserman, Spring Valley, all of N.Y.; Alfred C. Glatz, Stamford, Conn.

[73] Assignee: General Foods Corporation, White Plains, N.Y.

[21] Appl. No.: 88,482

[22] Filed: Oct. 26, 1979

[51] Int. Cl.³ .............................................. A23G 3/00
[52] U.S. Cl. .................................... 426/96; 426/103; 426/453; 426/572; 426/548; 426/660
[58] Field of Search .............. 426/572, 658, 660, 103, 426/96, 548, 474

[56] References Cited

U.S. PATENT DOCUMENTS

| | | | |
|---|---|---|---|
| 2,082,313 | 6/1937 | Todd | 426/474 |
| 2,197,919 | 4/1940 | Bowman | 426/660 |
| 3,012,893 | 12/1961 | Kremzner | 426/572 |
| 4,105,801 | 8/1978 | Dogliotti | 426/103 |
| 4,127,645 | 11/1978 | Witzel | 426/548 |

*Primary Examiner*—Jeanette M. Hunter
*Attorney, Agent, or Firm*—Daniel J. Donovan; Bruno P. Struzzi; Thomas R. Savoie

[57] ABSTRACT

A confection of gasified candy dispersed in a hard binding matrix of crystallized sorbitol.

37 Claims, No Drawings

GASIFIED CANDY DISPERSED IN A MATRIX OF SORBITOL

BACKGROUND OF THE INVENTION

1. Field of the Invention

This invention relates to a confection composition. More particularly, it relates to a confection composition of gasified candy in a binding matrix containing sorbitol.

2. Description of the Prior Art

Gasified candy is a hard candy is a hard candy containing gas, such as carbon dioxide gas, as disclosed in U.S. Pat. Nos. 3,012,893 of Kremzner and Mitchell, 3,985,909 and 3,985,910 of Kirkpatrick and 4,061,457 of Hegadron which are herein incorporated by reference. Such a candy is made by the process which comprises melting crystalline sugar, contacting such sugar with gas at a pressure of 50 to 1,000 psig for a time sufficient to permit incorporation in said sugar of 0.5 to 15 cm$^3$ of gas per grams of sugar, maintaining the temperature of said sugar during said incorporation above the solidification temperature of the melted sugar, and cooling said sugar under pressure to produce a solid amorphous sugar containing the gas. Upon the release of the pressure the solid gasified candy fractures into granules of assorted sizes.

The resultant product contains 1% to 4% water and most typically 2% to 3% water by weight of the total composition. (All percentage figures herein are in terms of weight percent unless expressly stated otherwise.) Lower levels of moisture are not practicably obtainable because the additional heat necessary to drive off the water causes the candy melt to caramelize or burn, resulting in an off-flavor, undesirable product. Higher moisture levels result in a soft, sticky matrix which rapidly liberates the entrapped gas and is thus not storage stable. Further, the gasified candy does not remain stable at temperatures above about 110° F.

The gasified candy when placed in the mouth produces an entertaining but short-lived popping or sizzling sensation. As the candy is wetted in the mouth the candy melts and the entrapped gas escapes. The tingling effect in the mouth is sensational but short.

In order to store the granules of gasified candy, they must be isolated from any source of free water which would soften the candy and allow the trapped gas to escape. Gasified candy, therefore, is packaged in moisture resistant containers, viz., metal foil and plastic laminated sealed envelopes.

When the solidified gasified candy is fractured into granulated pieces by the release of pressure from the preparation vessel, the resultant product is sieved to provide the gasified candy in uniformly sized pieces.

It is an object of this invention to provide confection compositions of several components, including gasified candy.

It is an object of this invention to provide controlled shaped unitary pieces from particles of gasified candy.

it is another object of this invention to provide gasified candy in a coated form which will not require moisture resistant packaging.

It is still further object of this invention to utilize gasified candy in a confection composition.

It is still another object of this invention to provide additional confections that provide a variety of sensory effects including a sizzling or popping mouthfeel sensation.

SUMMARY OF THE INVENTION

In accordance with the present invention it has been found that a confection containing granulated gasified candy does not require moisture proof packaging where the granules of gasified candy containing 0.5 to 15 cm$^3$ of gas per gram of candy are dispersed in a hard, binding matrix containing crystallized sorbitol. More particularly, the invention is directed to a controlled shaped confection which comprises granules of gasified candy dispersed in a binding matrix comprising sorbitol.

This invention is also directed to a method of preparing this confection which comprises (a) supercooling a liquid comprising sorbitol to below 120° F. to produce a viscous glass matrix comprising sorbitol and having a moisture content of below 3%, (b) combining granules of gasified candy with said glass matrix whereby the gasified candy is enrobed, (c) forming discrete pieces of enrobed gasified candy and (d) allowing the matrix to crystallize and become hard.

DESCRIPTION OF THE PREFERRED EMBODIMENTS

The present invention relates to a confection comprising gasified candy in discrete pieces which produces a sizzling effect when dissolved in the mouth. By enrobing the gasified candy, a hard predetermined shaped piece is formed from random sized particles of gasified candy. These pieces are somewhat resistant to moisture but require a further coating or protective package to provide satisfactory storage stability.

Briefly the confection consists of granulated candy suspended in a binding matrix containing a sugar alcohol, sorbitol.

Optionally a final coat of edible shellac or varnish, colored if desired, may be applied to the confection to improve its moisture resistance. Alternately, a final coating of sugar, either in hard or powdered form, may be applied to the outer surface of the carbonated candy. This sugary coating can be colored if desired. In addition or alternately, a polished waxy coating of, for example, beeswax or carnauba wax may be applied to the outer surface of the discrete piece of confection.

The moisture and temperature sensitivity of gasified candy requires a matrix capable of being worked at low temperatures (less than 120° F.) and low moisture content (less than 3%) and yet be capable of forming a hardened matrix at room temperature and normal storage conditions. Thus, the material must have a low moisture content which is compatible with the gasified candy and must be capable of being rendered in a form or a condition which permits it to be combined with the gasified candy at a temperature no higher than about 110° F. Further, this material must, of course, be edible and must be tasteless or have a taste which is or which can be rendered compatible with the taste of carbonated candy. The only material known to have this capability is sorbitol per se or in mixtures with other ingredients.

Sorbitol, one of the sugar alcohols, possesses properties which make it especially useful in the binding matrix in the present invention. Sorbitol will remain in the metastable state, i.e. it is easily supercooled, becoming hard with only minor amounts of crystallization if not stirred. When sorbitol is melted and held in that condition until substantially all the water is driven off and then supercooled, it forms a viscous glassy melt which can be easily kneaded at about 100° F., preferably about 90°–120° F., which conveniently is substantially the upper limit of the temperature range within which the carbonated candy remains stable. Although sorbitol can be readily cooled to room temperature in a supercooled fluid state, it will upon standing, crystallize into a hard solid. Thus, sorbitol is especially suited as an enrobant for gasified candy producing hard discrete peices of carbonated candy confection of predetermined size. This sweet product is hard to chew, i.e., it is a sucking rather than a chewing candy, and produces a sizzling effect as the binding matrix of sorbitol slowly dissolves exposing the gasified candy to the moisture in the mouth.

Other caloric sweetners can be combined with the sorbitol to form the binding matrix. Such sweetners as corn syrup (dextrins, maltose and dextrose), dextrose, mannitol, lactose, sucrose, fructose and other saccharides can be used. The metastable properties of sorbitol are evidenced in these combinations producing the desirable glassy melt in a pliable state. Significant amounts of the saccharides can be employed in these useful mixtures. A mixture of 65% dextrose, 35% sorbitol can be supercooled to a viscous mass which is easily kneaded at about 100° F. A mixture of 60–80% frustose, 40–20% sorbitol can similarly be used. A mixture of corn syrup with at least 60% sorbitol is also useful. Other saccharides produce similar results although the ratios of sorbitol to saccharide will vary of course. The addition of up to 1% vegetable oil may be desirable. It acts as a lubricant to make the material easier to handle.

The moisture content of the binding matrix should be below about 3%, preferably in the 1–2% range or below. The moisture content must be compatible with the gasified candy, i.e., at least equal to and preferably less than that of the gasified candy.

The gasified candy component of the instant confection is hard sugar product having bubbles of gas, such as carbon dioxide, entrapped therein and is conveniently produced according to the process disclosed in U.S. Pat. No. 3,012,893 and discussed hereinbefore. U.S. Pat. Nos. 3,985,909 and 3,985,910 to Kirkpatrick and 4,061,457 to Hegadorn disclose additional and/or optional details regarding the process of preparing gasified candy. The gasified candy can be prepared from any of the commercially-available sugars employed in the confectionary industry. Thus, such sugars as glucose, fructose, sucrose, lactose, etc. alone or in combination may be employed in practicing the instant invention. A combination of sucrose and lactose provides a preferred product. A mixture of sucrose with corn syrup (containing glucose, maltose, dextrin) is also satisfactory. A mixture of sucrose, lactose and corn syrup in a weight ratio of 52:27:21 is particularly preferred providing an excellent gasified, hard product particularly characterized by its good gas retention and reduced stickiness on standing. A 40:40:20 mixture of sucrose, lactose and corn syrup is especially preferred; it additionally provides good high temperature stability. The moisture content of the gasified candy is typically between 1.0 and 4.0%. Preferably, it is between 2.0 and 3.0%. Gasified candy pieces in a variety of sizes may be employed, although it is preferred that the pieces be sieved to produce uniform sized pieces and thus facilitate the preparation of the confection. Small sized pieces distribute better in the matrix and provide a more uniform sizzling characteristic in the final crystallized product. Gasified candy having a particle size distribution of $-4$ to $+40$ U.S. Sieve Series can be employed although two ranges, $-4$ to $+14$ and $-14$ to $+40$ U.S. Sieve Series, are preferred.

A sugarless form of gasified candy can also be employed in this invention by substituting a sugarless material, such as sorbitol, for the sugar in the gasified candy preparations described herein.

The gases used to prepare the gasified candy of the present invention may be carbon dioxide, nitrogen or air but carbon dioxide is preferred. The gas is entrapped within the solidified candy under superatmospheric pressure. The gasified sugar contains 0.5 to 15, preferably 2 to 7, $cm^3$ of gas per gram of candy.

Coloring, flavoring and active ingredients may be incorporated in the gasified candy and/or the binding matrix to enhance the eye appeal of the confection and to provide a pleasing taste to compliment the sizzle effect of the gasified candy. Commercial colorings are available in a variety of hues for incorporation into foodstuffs. The choice will be dependent on the desired effect and, possibly, the flavoring to be incorporated into the confection. Flavors such as wintergreen, spearmint, peppermint, birch, anise, fruit flavors, mixtures thereof and the like may be used satisfactorily with the confection of the present invention and are available commercially. Active ingredients are also available for incorporation into the confection to provide a product useful as a breath refresher. The amount of coloring, flavoring and/or active ingredient used will vary depending on the type used, individual taste preferences, the carbonated candy and binding matrix employed and other considerations well known to those skilled in the confectionary art. The entrapped gas provides a gaseous means for sweeping flavor or fragrances from the candy.

The confection of the invention may be prepared by any of several embodiments. In general, the binding matrix is melted, then supercooled to a viscous mass and the granulated gasified candy is incorporated therein without loss of gasification. Some of the particulars and variations are described herein. Those skilled in the art will appreciate that variations and modifications of the procedures described herein can be employed to produce the gasified candy confection of the present invention.

(In the following descriptions, sorbitol is stated to constitute the binding matrix. This has been done for convenience only. It should be understood that mixtures of sorbitol with saccharides, as described hereinbefore, can equally be utilized to form the binding matrix in the following descriptions.)

The binding matrix may be prepared by melting sorbitol crystals at 300°–395° F. or evaporating aqueous sorbitol and holding the liquid at an elevated temperature, usually above 300° F., typically about 340°–395° F., and under vacuum to reduce the moisture content to below about 3%, preferably about 1–2%, typically about 1.3–1.7%. The use of vacuum will facilitate attaining the desired water content. The sorbitol-containing melt is then formed into a thin sheet at room temperature to produce the glassy melt. In one method, the liquid may be poured into a tray to form a thin viscous layer as it cools. The layer should be less than ¼" thick, preferably about ⅛" to 1/16" thick. The thin layer of viscous glassy melt can also be prepared by feeding the liquid onto a cooling belt where the supercooling takes place before a doctor blade scrapes the viscous material onto a continuous belt. Granulated gasified candy is then sprinkled onto the thin sheet of supercooled glassy melt. The gasified candy constitutes about 10–50%, preferably 20–30% of the confection. Next, the gasified candy is kneaded into the glassy melt so that it is coated with the sorbitol glassy melt to form a mixture of gasified candy dispersed in a binding matrix. This may be accomplished in any of several methods. For example, the thin sheet can be folded over by hand to form a rope which may then be rolled out to the desired thickness, usually about ¼" or less. The gasified candy can also be hand kneaded into the glassy melt and then formed into a sheet of the desired thickness by passing it between mechanical rollers. In yet another procedure the sheet of glassy melt containing the gasified candy can be fed to a double screw or double reel extruder which mixes the gasified candy and the glassy melt and produces a sheet of the confection in the desired thickness. Again, where the glassy melt is scraped from a cooling wheel onto a continuous belt and gasified candy is sprinkled thereon, ploughs can be used to form a double layer of glassy melt encompassing the gasified candy and pass it to laminating rolls which produce a sheet of the confection. All of these procedures produce a thin sheet of confection where the granulated gasified candy is dispersed in and enrobed with sorbitol. This sheet is then formed into discrete pieces of the confection by scoring, stamping or otherwise molding the sheet to produce the desired shape. One convenient way to do this is to pass the sheet through Dragee forming rolls which score the sheet into square or rectangular "pillows" of the confection. The discrete pieces are permitted to harden at room temperature for several hours during which time the glassy binding matrix slowly crystallizes to produce pieces of hard candy.

In one embodiment of this invention, the sorbitol is supercooled until it soldifies into an amorphous solid suitable for grinding. Temperatures below room temperature are required, e.g., a temperature of 0° F. is satisfactory. This material is then granulated and dry blended with the granulated gasified candy. The dry mixture is formed into a thin layer, viz., on a table or a belt, and held at room temperature. Within a short time, usually 30–60 minutes, the sorbitol softens forming a binding matrix around the gasified candy. The softened sheet can then be processed into discrete pieces by any of the procedures described above and the pieces allowed to crystallize into the final hard candy product.

It has been found that the use of higher blending (kneading) temperatures and/or higher moisture levels of the sorbitol matrix permits higher concentrations of gasified candy to be incorporated into the confection. Those skilled in the art can appreciate that extreme care must be exercised in employing these more "severe" conditions since high temperatures and high moisture levels can result in the loss of entrapped gas from the candy.

The square or rectangular pillows of the confection of the present invention may serve as the finished product since the binding matrix provides a vapor barrier somewhat protecting the gasified candy from moisture. Preferably, a hard coat of edible shellac or varnish or hard sugar (including sorbitol), colored if desired, can be applied to the confection. In one embodiment, a shiny hard coating is applied by a procedure known in the confectionary art as "pan coating" where the coating is applied and polished. In another embodiment a dry coating is applied which produces a tablet within a tablet. In the procedure, well known in the confectionary art, the coating material is fed to a granulator and then applied to the confection in a machine known as a "dry coater". Tablets of the confection may be prepared by direct compression tableting. Any of the known and commercially available binding agents such as hydrolyzed cornstarches and sugar can be employed to form the hard protective shell around the confection. Gasified candy prepared from the 40:40:20 preferred formulation of sucrose: lactose: corn syrup can withstand significantly higher pressures in the tableting process than the 52:27:21 formulation.

Other means of forming discrete pieces of candy which are known in the confectionary art may also be employed to prepare the confection of the invention keeping in mind that certain precautions have to be observed because of the nature of the binding matrix and the carbonated candy. These coatings protect the confection from moisture and physical abuse and also improve appearance.

The discrete pieces of the confection may be individually wrapped and a number of these wrapped pieces placed in an outer wrapping. Alternatively, a number of individual pieces may be stacked and wrapped together into a package.

The confection of this invention provides the candy lover with a pleasing combination of organoleptic effects which be delivered in small "pillowed" rectangles or squares, all providing sizzle plus a breath freshening and a flavored sweetness. The combination of these distinctive effects is most pleasing, pleasant and unusual and is quite unlike that of any other candy or confection. By permitting the confection to dissolve in the mouth, a sustained popping or sizzling is produced as the melting binding matrix gradually exposes the gasified candy to the moisture in the mouth. Surprisingly, this tingling effect is significantly more prolonged than that which is experienced when carbonated candy is placed in the mouth.

What is claimed is:

1. A confection which comprises:
   granules of gasified candy containing 0.5 to 15 cm$^3$ of gas/gram of candy dispersed in a hard, binding matrix comprising crystallized sorbitol.

2. A confection according to claim 1, wherein the binding matrix additionally contains corn syrup, dextrose, lactose, sucrose, fructose or mixtures thereof.

3. A confection according to claim 1 wherein the gasified candy is selected from the group consisting of glucose, fructose, sucrose, lactose, corn syrup and mixtures thereof.

4. a confection according to claim 1 wherein the gasified candy comprises sorbitol.

5. A confection according to claim 1 wherein the gasified candy additionally contains coloring, flavoring or active ingredient.

6. A confection according to claim 1 wherein the binding matrix additionally contains coloring, flavoring or active ingredient.

7. A confection according to claim 1 wherein the gasified candy has a particle size distribution of $-4$ to $+40$ U.S. Sieve Series.

8. A confection according to claim 1 wherein the gasified candy has a particle size distribution of $-4$ to $+14$ U.S. Sieve Series.

9. A confection according to claim 1 wherein the gasified candy has a particle size distribution of $-14$ to $+40$ U.S. Sieve Series.

10. A confection according to claim 1 wherein the gasified candy comprises 10–50% of the confection.

11. A confection according to claim 1 wherein the gasified candy comprises 20–30% of the confection.

12. A confection according to claim 1 wherein the gasified candy contains 2 to 7 cm$^3$ of gas/gram of candy.

13. A confection according to claim 1 wherein the moisture content of the gasified candy is 2–3% and of the binding matrix is 1–2%.

14. A confection according to claim 1 wherein the confection has a layer of edible shellac or varnish or hard sugar formed on its outer surface.

15. A confection according to claim 14 wherein the layer is a pan coated layer.

16. A confection according to claim 14 wherein the layer is a dry coated layer.

17. A confection according to claim 14 wherein the layer is formed by direct compression.

18. A confection according to claim 14 wherein the sugar is sucrose, lactose, dextrose, or sorbitol.

19. A method of preparing a confection which comprises:
   (a) supercooling a liquid comprising sorbitol to below 120° F. to produce a viscous glass matrix comprising sorbitol and having a moisture content of below 3%,
   (b) combining granules of gasified candy containing 0.5 to 15 cm$^3$ of gas/gram of candy with said glass matrix whereby the gasified candy is enrobed,
   (c) forming discrete pieces of enrobed gasified candy, and
   (d) allowing the matrix to crystallize and become hard.

20. A method according to claim 19, including the following additional step:
   (e) forming a layer of edible shellac or varnish or hard sugar on the outer layer of the confection.

21. A method according to claim 19 wherein the liquid is supercooled to a temperature of about 90°–120° F.

22. A method according to claim 19 wherein step (b) comprises extruding.

23. A method according to claim 19 wherein step (b) comprises rolling.

24. A method according to claim 19 wherein step (c) comprises scoring.

25. A method according to claim 19 wherein step (c) comprises stamping.

26. A method according to claim 20 wherein step (e) comprises pan coating.

27. A method according to claim 20 wherein step (e) comprises dry coating.

28. A method according to claim 20 wherein step (e) comprises direct compression tableting.

29. A method according to claim 19 wherein the liquid of step (a) additionally contains corn syrup, dextrose, lactose, sucrose, fructose or mixtures thereof.

30. A method according to claim 19 wherein the gasified candy is selected from the group consisting of glucose, fructose, sucrose, lactose, corn syrup and mixtures thereof.

31. A method according to claim 19 wherein the gasified candy comprises sorbitol.

32. A confection according to claim 19 wherein the gasified candy and the binding matrix additionally contain coloring, flavoring or active ingredient.

33. A method according to claim 19 wherein the gasified candy has a particle size distribution of −4 to +14, −14 to +40, or −4 to +40 U.S. Sieve Series.

34. A method according to claim 19 wherein the gasified candy comprises 10–50% of the confection.

35. A method according to claim 19 wherein the gasified candy comprises 20–30% of the confection.

36. A method according to claim 19 wherein the gasified candy contains 2 to 7 cm$^3$ of gas/gram of candy.

37. A method according to claim 19 wherein the moisture content of the gasified candy is 2–3% and of the binding matrix is 1–2%.

* * * * *